United States Patent
Nasman et al.

(10) Patent No.: US 8,194,384 B2
(45) Date of Patent: Jun. 5, 2012

(54) HIGH TEMPERATURE ELECTROSTATIC CHUCK AND METHOD OF USING

(75) Inventors: Ronald Nasman, Averill Park, NY (US); Rodney L. Robison, East Berne, NY (US); Toshiaki Fujisato, Tokyo (JP)

(73) Assignee: Tokyo Electron Limited (JP)

( * ) Notice: Subject to any disclaimer, the term of this patent is extended or adjusted under 35 U.S.C. 154(b) by 817 days.

(21) Appl. No.: 12/178,327

(22) Filed: Jul. 23, 2008

(65) Prior Publication Data

US 2010/0020463 A1 Jan. 28, 2010

(51) Int. Cl.
*H01L 21/683* (2006.01)
*H01T 23/00* (2006.01)

(52) U.S. Cl. ..................................... 361/234

(58) Field of Classification Search .................. 361/234; 279/128
See application file for complete search history.

(56) References Cited

U.S. PATENT DOCUMENTS

| | | | |
|---|---|---|---|
| 4,888,247 A | | 12/1989 | Zweben et al. |
| 5,191,506 A * | | 3/1993 | Logan et al. ............... 361/234 |
| 5,745,331 A * | | 4/1998 | Shamouilian et al. ........ 361/234 |
| 5,787,976 A | | 8/1998 | Hamburgen et al. |
| 5,914,568 A * | | 6/1999 | Nonaka .................... 315/111.21 |
| 5,968,273 A * | | 10/1999 | Kadomura et al. ........... 118/715 |
| 6,023,405 A * | | 2/2000 | Shamouilian et al. ........ 361/234 |
| 6,104,596 A * | | 8/2000 | Hausmann .................... 361/234 |
| 6,364,957 B1 * | | 4/2002 | Schneider et al. ............ 118/728 |
| 6,377,437 B1 * | | 4/2002 | Sexton et al. ................ 361/234 |
| 6,414,834 B1 * | | 7/2002 | Weldon et al. ................ 361/234 |
| 6,432,208 B1 * | | 8/2002 | Kawakami et al. ............ 118/728 |
| 6,490,144 B1 * | | 12/2002 | Narendrnath et al. ......... 361/234 |
| 6,538,872 B1 * | | 3/2003 | Wang et al. ................... 361/234 |
| 6,566,630 B2 * | | 5/2003 | Kitamura ...................... 219/390 |
| 6,567,258 B2 * | | 5/2003 | Sexton et al. ................. 361/234 |
| 6,668,037 B2 * | | 12/2003 | Hara et al. ....................... 378/34 |
| 6,669,783 B2 * | | 12/2003 | Sexton et al. ................. 118/728 |
| 6,716,302 B2 * | | 4/2004 | Carducci et al. .......... 156/345.47 |
| 6,719,886 B2 * | | 4/2004 | Drewery et al. ......... 204/298.18 |
| 6,853,533 B2 * | | 2/2005 | Parkhe ........................... 361/234 |
| 7,033,444 B1 * | | 4/2006 | Komino et al. ............... 118/725 |
| 7,175,737 B2 * | | 2/2007 | Sago et al. ............... 156/345.53 |
| 7,316,721 B1 * | | 1/2008 | Redden et al. .................. 55/428 |
| 7,326,886 B2 * | | 2/2008 | Inoue ......................... 219/444.1 |
| 7,403,386 B2 * | | 7/2008 | Aihara et al. ................. 361/694 |
| 7,589,950 B2 * | | 9/2009 | Parkhe et al. ................. 361/234 |

(Continued)

OTHER PUBLICATIONS

International Searching Authority, International Search Report and Written Opinion, International Application No. PCT/US09/50397, Mailed Sep. 1, 2009, 8 pages.

(Continued)

*Primary Examiner* — Rexford Barnie
*Assistant Examiner* — Christopher Clark (57) ABSTRACT

An electrostatic chuck configured for high temperature reduced-pressure processing is described. The electrostatic chuck comprises a chuck body having an electrostatic clamp electrode and an optional heating element, and a heat sink body having a heat transfer surface spaced in close relationship with an inner surface of the chuck body, wherein the heat sink body is configured to remove heat from the chuck body due to the close proximity of the inner surface and the heat transfer surface. The electrostatic chuck further comprises a table assembly configured to support the chuck body and the heat sink body, and an expansion joint disposed between the chuck body and the table assembly, and configured to sealably join the chuck body to the table assembly while accommodating for differential thermal expansion of the chuck body and the table assembly.

37 Claims, 6 Drawing Sheets

U.S. PATENT DOCUMENTS

| | | | |
|---|---|---|---|
| 7,619,870 B2* | 11/2009 | Himori et al. | 361/234 |
| 7,697,260 B2* | 4/2010 | Brown et al. | 361/234 |
| 7,718,029 B2* | 5/2010 | Sun et al. | 156/325 |
| 7,826,724 B2* | 11/2010 | Cunningham et al. | 392/379 |
| 2002/0075624 A1* | 6/2002 | Wang et al. | 361/234 |
| 2004/0085706 A1 | 5/2004 | Tomoyoshi | 361/234 |
| 2004/0240142 A1* | 12/2004 | Fujii et al. | 361/233 |
| 2005/0042881 A1* | 2/2005 | Nishimoto et al. | 438/710 |
| 2006/0002053 A1* | 1/2006 | Brown et al. | 361/234 |
| 2007/0089835 A1* | 4/2007 | Koshimizu et al. | 156/345.29 |
| 2009/0308537 A1* | 12/2009 | Shibuya et al. | 156/345.35 |

OTHER PUBLICATIONS

PCT International Preliminary Report on Patentability issued on Jan. 25, 2011, in counterpart PCT application PCT/US2009/050397, filed on Jul. 13, 2009.

* cited by examiner

HIGH TEMPERATURE ELECTROSTATIC CHUCK AND METHOD OF USING

BACKGROUND OF THE INVENTION

1. Field of the Invention

The invention relates to an electrostatic chuck and a method of operating and, more particularly, to a high temperature electrostatic chuck and a method of operating.

2. Description of Related Art

It is known in semiconductor manufacturing and processing that various processes, including for example etch and deposition processes, depend significantly on the temperature of the substrate. For this reason, the ability to control the temperature of a substrate and controllably adjust the temperature of the substrate is becoming an essential requirement of a semiconductor processing system. The temperature of a substrate is determined by many processes including, but not limited to, substrate interaction with plasma, chemical processes, etc., as well as radiative and/or conductive thermal exchange with the surrounding environment. Providing a proper temperature to the upper surface of the substrate holder can be utilized to control the temperature of the substrate.

SUMMARY OF THE INVENTION

The invention relates to an electrostatic chuck and a method of operating and, more particularly, to a high temperature electrostatic chuck and a method of operating.

According to one embodiment, an electrostatic chuck configured for high temperature reduced-pressure processing is described. The electrostatic chuck comprises a chuck body having an electrostatic clamp electrode and an optional heating element, and a heat sink body having a heat transfer surface spaced in close relationship with an inner surface of the chuck body, wherein the electrostatic clamp electrode is configured to clamp a substrate on an outer surface of the chuck body and wherein the heat sink body is configured to remove heat from the chuck body due to the close relationship of the inner surface and the heat transfer surface. The electrostatic chuck further comprises a table assembly configured to support the chuck body and the heat sink body, and an expansion joint disposed between the chuck body and the table assembly, and configured to sealably join the chuck body to the table assembly while accommodating for differential thermal expansion of the chuck body and the table assembly.

According to another embodiment, a method of operating a high temperature electrostatic chuck is described, comprising: preparing an electrostatic chuck for use in a substrate processing system, the electrostatic chuck comprising a chuck body, a heat sink body, a table assembly configured to support the chuck body and the heat sink body, and an expansion joint disposed between the chuck body and the table assembly, and configured to sealably join the chuck body to the table assembly while accommodating for differential thermal expansion of the chuck body and the table assembly; disposing a substrate on an outer surface of the chuck body; clamping the substrate to the outer surface of the chuck body by coupling a voltage to an electrostatic clamp electrode formed within the chuck body; elevating a temperature of the substrate by coupling power to one or more heating elements formed within the chuck body; and controlling the temperature of the substrate by maintaining the heat sink body at a heat sink temperature less than the temperature of the substrate and spacing a heat transfer surface of the heat sink body in close relationship to an inner surface of the chuck body.

DETAILED DESCRIPTION OF EXEMPLARY EMBODIMENTS

In the following description, for purposes of explanation and not limitation, specific details are set forth, such as a particular geometry of the substrate holder for a substrate processing system and descriptions of various components and processes. However, it should be understood that the invention may be practiced in other embodiments that depart from these specific details.

Nonetheless, it should be appreciated that, contained within the description are features which, notwithstanding the inventive nature of the general concepts being explained, are also of an inventive nature.

Figure 1:
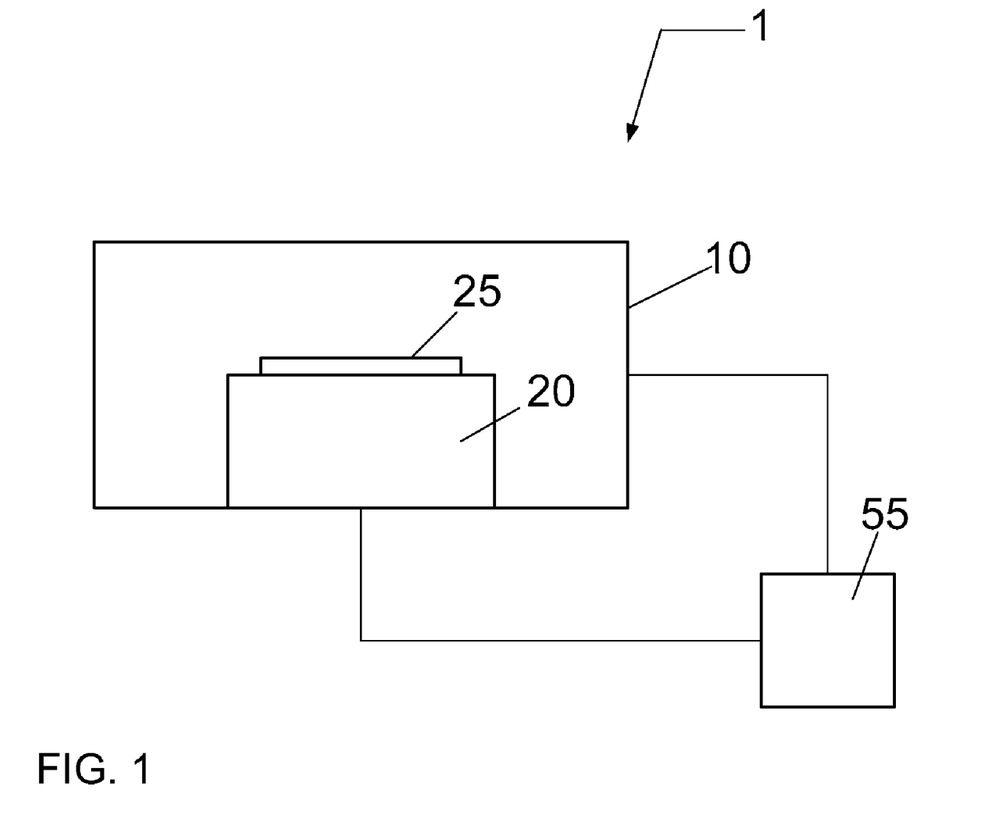
FIG. 1 presents a block diagram of a substrate processing system according to an embodiment.

According to an embodiment of the present invention, a substrate processing system 1 is depicted in FIG. 1 that includes a process tool 10 having a substrate holder 20 and a substrate 25 supported thereon. The substrate holder 20 is configured to provide temperature control elements for adjustment of substrate temperature. Additionally, the temperature control elements may be spatially arranged in order to ensure a uniform or non-uniform substrate temperature. A controller 55 is coupled to the process tool 10 and the substrate holder 20, and is configured to monitor, adjust, and control the substrate temperature as will be further discussed below.

In the illustrated embodiment depicted in FIG. 1, the substrate processing system 1 can include a deposition system. For example, the deposition system can facilitate a vapor deposition process, such as a chemical vapor deposition (CVD) process, a plasma enhanced CVD (PECVD) process, an atomic layer deposition (ALD) process, a plasma enhanced ALD (PEALD) process, a physical vapor deposition (PVD) process, or an ionized PVD (iPVD) process. Alternatively, the substrate processing system 1 can include an etch chamber. For example, the etch chamber can facilitate dry plasma etching, or, alternatively, dry non-plasma etching. Alternately, the substrate processing system 1 includes a photo-resist coating chamber such as a heating/cooling module in a photo-resist spin coating system that may be utilized for post-application bake (PAB) or post-exposure bake (PEB), etc.; a photo-resist patterning chamber such as a photo-lithography system; a dielectric coating chamber such as a spin-on-glass (SOG) or spin-on-dielectric (SOD) system; or a rapid thermal processing (RTP) chamber such as a RTP system for thermal annealing.

Figure 2:
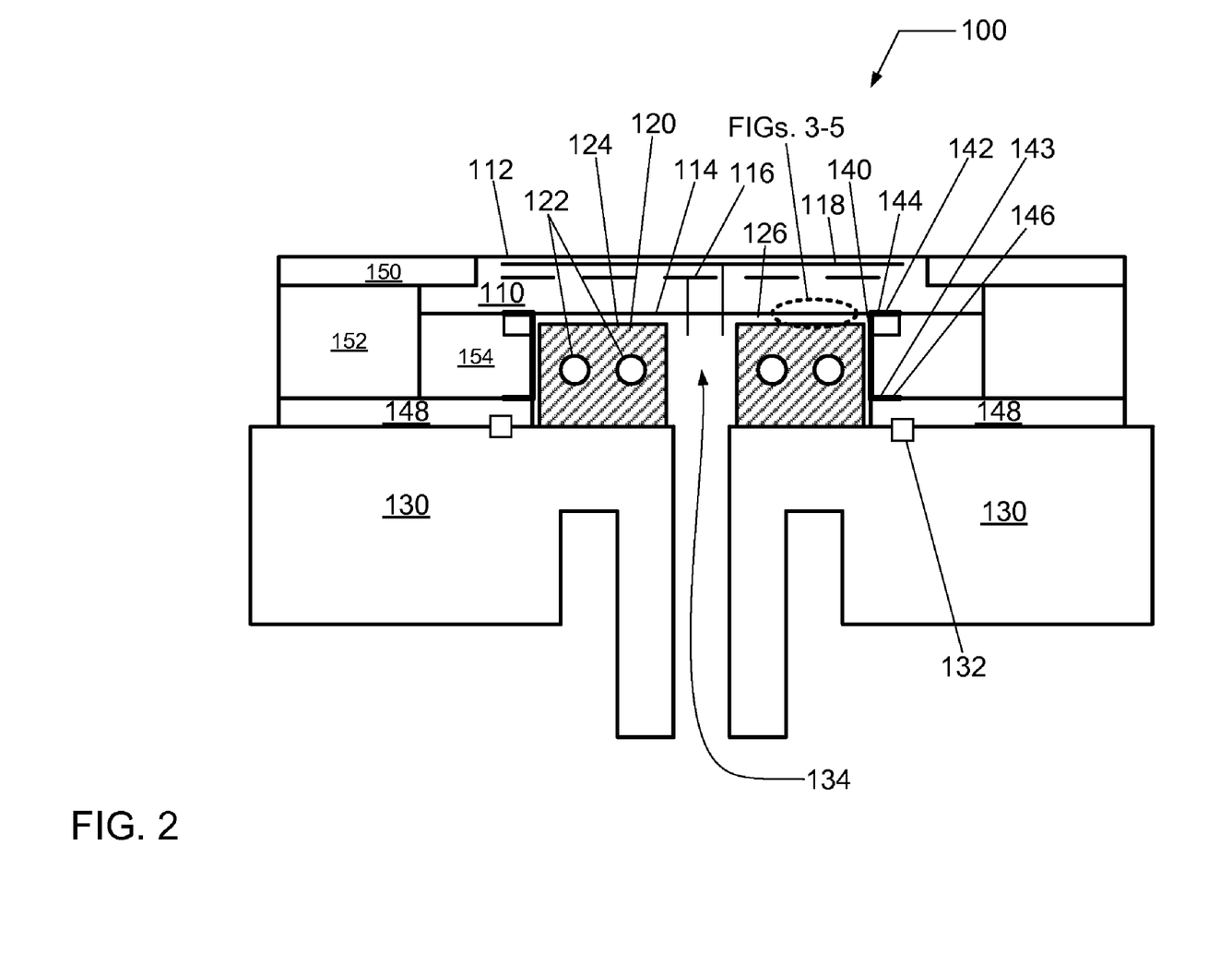
FIG. 2 presents a schematic cross-sectional view of a substrate holder according to an embodiment.

Referring now to FIG. 2, an electrostatic chuck 100 configured for high temperature, reduced-pressure processing of a substrate is described according to one embodiment. The electrostatic chuck 100 comprises a chuck body 110 having an electrostatic clamp electrode 118 and an optional heating element 116, and a heat sink body 120 comprising a heat transfer surface 124 spaced in close relationship with and thermally coupled to an inner surface 114 of the chuck body 110. The electrostatic clamp electrode 118 is configured to clamp a substrate (not shown) on an outer surface 112 of the chuck body 110. Additionally, the heat sink body 120 is configured to remove heat from the chuck body 110 through gap 126 due to the close proximity of the inner surface 114 and the heat transfer surface 124.

Additionally, the electrostatic chuck 100 comprises a table assembly 130 configured to support the chuck body 110 and the heat sink body 120. Furthermore, an expansion joint 140 is disposed between the chuck body 110 and the table assembly 130, and configured to sealably join the chuck body 110 to the table assembly 130 while accommodating for differential thermal expansion of the chuck body 110 and the table assembly 130.

The expansion joint 140 may comprise a material having a coefficient of thermal expansion of intermediary value between a first coefficient of thermal expansion associated with the chuck body 110 and a second coefficient of thermal expansion associated with the table assembly 130. For example, the expansion joint 140 may be fabricated from a Ni—Co—Fe alloy, such as KOVAR®.

As illustrated in FIG. 2, the expansion joint 140 may comprise a thin ring having a first end 144 configured to be attached to the chuck body 110 and a second end 146 configured to be attached to the table assembly 130. The first end 144 of the thin ring may be brazed to the chuck body 110 via braze joint 142. Additionally, the second end 146 of the thin ring may be welded to a mounting flange 148 via weld joint 143, wherein the mounting flange 148 is configured to be sealably fastened to the table assembly 130 via seal 132. For example, the seal 132 may comprise an elastomer seal, or a metal gasket seal.

The chuck body 110 may be fabricated from a metallic material or a non-metallic material. The chuck body 110 can be fabricated from a electrically non-conductive material, such as a ceramic. The chuck body 110 may be fabricated from a material that is electrically non-conductive, yet exhibits relatively high thermal conductivity. For example, chuck body 110 can be fabricated from alumina, or preferably aluminum nitride. However, other materials may be used.

According to one embodiment, the electrostatic clamp electrode 118 is embedded within the chuck body 110. The electrostatic clamp electrode 118 can be positioned between two ceramic pieces which are sintered together to form a monolithic piece. Alternatively, the electrostatic clamp electrode 118 may be thermally sprayed onto a ceramic piece, followed by thermally spraying a ceramic layer over the electrostatic clamp electrode 118. Thereafter, the sprayed ceramic layer may be planarized to form a planar outer surface. Using similar techniques, other electrodes, or metal layers, may be inserted within the chuck body 110. For example, the one or more optional heating elements 116 may be inserted between ceramic layers and formed via sintering or spraying techniques as described above. The one or more optional heating elements 116 and the electrostatic clamp electrode 118 may be in the same plane or in separate planes, and may be implemented as separate electrodes or implemented as the same physical electrode.

The electrostatic clamp electrode 118 may comprise one or more clamping electrodes embedded within chuck body 110. The electrostatic clamp electrode 118 may be configured as a monopolar or bipolar electrode that is coupled to a high-voltage (HV) direct current (DC) voltage supply (not shown) via an electrical connection. The design and implementation of such a clamp is well known to those skilled in the art of electrostatic clamping systems.

The one or more optional heating elements 116 can comprise at least one of a heating fluid channel, a resistive heating element, or a thermoelectric element biased to transfer heat towards the wafer. Desirably, the one or more optional heating elements 116 comprise a resistive heating element coupled to a power source, such as a DC or alternating current (AC) power source.

Furthermore, the one or more optional heating elements 116 may comprise a filament containing tungsten, nickel-chromium alloy, aluminum-iron alloy, aluminum nitride, etc. Examples of commercially available materials to fabricate resistive heating elements include Kanthal, Nikrothal, Akrothal, which are registered trademark names for metal alloys produced by Kanthal Corporation of Bethel, Conn. The Kanthal family includes ferritic alloys (FeCrAl) and the Nikrothal family includes austenitic alloys (NiCr, NiCrFe). As an example, the one or more optional heating elements 116 may comprise a first heating element positioned at a substantially central region of the substrate and a second heating element positioned at a substantially edge region of the substrate.

A heating element control unit (not shown) may be constructed and arranged to control a temperature of the one or more optional heating elements 116, the chuck body 110, or the substrate, or any combination of two or more thereof. The heating element control unit may comprise one or more temperature sensors, and a controller configured to exchange information with a power source to perform at least one of monitoring, adjusting, or controlling the temperature of the one or more optional heating elements 116, the chuck body 110, or a substrate, or any combination of two or more thereof. The heating element control unit is configured to provide either dependent or independent control of each heating element. The heating element control unit may be coupled to a control system and may be configured to exchange information with the control system.

The heat sink body 120 may be fabricated from a metallic material or a non-metallic material. For example, the heat sink body 120 can be fabricated from aluminum. Additionally, for example, the heat sink body 120 can be formed of a material having a relatively high thermal conductivity, such that the temperature of the heat sink body 120 can be maintained at a relatively constant temperature. The temperature of the heat sink body 120 is preferably actively controlled by one or more temperature control elements 122, such as cooling elements. However, the heat sink body 120 may provide passive cooling by use of cooling fins to promote enhanced free convection due to the increased surface area with the surrounding environment, for example.

The one or more temperature control elements 122 may be configured to heat and/or cool heat sink body 120. For example, the heat sink body 120 may include one or more fluid channels through which a re-circulating flow of a heat transfer fluid passes. When cooling, the flow of heat transfer fluid receives heat from heat sink body 120 and transfers heat to a heat exchanger system (not shown). Alternatively, when heating, the flow of heat transfer fluid receives heat from the heat exchanger and transfers heat to the heat sink body 120. The heat transfer fluid may comprise water, Fluorinert, Galden HT-135, etc. In other embodiments, the temperature control elements 122 may include resistive heating elements, or thermoelectric heaters/coolers.

A fluid thermal control unit (not shown) may be constructed and arranged to control a temperature of the heat transfer fluid. The fluid thermal control unit may comprise a fluid storage tank, a pump, a heater, a cooler, and a fluid temperature sensor. Additionally, the fluid thermal control unit may comprise one or more temperature sensors, and a controller configured to perform at least one of monitoring, adjusting, or controlling the temperature of the heat transfer fluid and/or heat sink body 120. The fluid thermal control unit may be coupled to a control system and may be configured to exchange information with the control system.

The table assembly 130 can further include one or more passages 134 there through to permit the coupling of electrical power to the one or more optional heating elements 116 of the chuck body 110, the coupling of electrical power to the electrostatic clamp electrode 118, the pneumatic coupling of heat transfer gas to the backside of the substrate (not shown), etc.

The table assembly 130 may, for example, be fabricated from an electrically and thermally conducting material such as aluminum, stainless steel, nickel, etc.

Additionally, the electrostatic chuck 100 may comprise a back-side gas supply system (not shown) for supplying a heat transfer gas, such as an inert gas including helium, argon, xenon, krypton, a process gas, or other gas including oxygen, nitrogen, or hydrogen, to the backside of the substrate through at least one gas supply line, and at least one of a plurality of orifices and channels (not shown). The backside gas supply system can, for example, be a multi-zone supply system such as a two-zone (center/edge) system, or a three-zone (center/mid-radius/edge), wherein the backside pressure can be varied in a radial direction from the center to edge. Furthermore, the backside gas supply system may be coupled to a control system and may be configured to exchange information with the control system.

In addition to the supply of heat transfer gas to the backside of the substrate, the outer surface 112 of the chuck body 110 may be tailored to further influence thermal transport between the substrate and the chuck body 110. The outer surface 112 may comprise microscopic roughness elements (e.g., surface finish characterized by, for instance, an average roughness Ra), or macroscopic roughness elements (e.g., channels, dimples, protrusions, columns, etc. fabricated within the outer surface 112), or a combination thereof. Additionally, the size, shape, or surface density, or any combination of two or more thereof may be varied across the outer surface 112 of chuck body 110. Additional details on the effect of surface roughness thermal transport are provided in U.S. Pat. No. 7,017,652, entitled "Method and apparatus for transferring heat from a substrate to a chuck"; the entire content of which is herein incorporated by reference in its entirety.

Furthermore, the electrostatic chuck 100 may comprise one or more temperature sensors (not shown) coupled to a temperature monitoring system (not shown). The one or more temperature sensors can be configured to measure the temperature of the substrate, or the one or more temperature sensors can be configured to measure the temperature of the chuck body 110, or the one or more temperature sensors can be configured to measure the temperature of the heat sink body 120, or any combination of two or more thereof. For example, the one or more temperature sensors may be positioned such that the temperature is measured at the lower surface of the chuck body 110, or positioned such that the temperature of a bottom of the substrate is measured.

The temperature sensor can include an optical fiber thermometer, an optical pyrometer, a band-edge temperature measurement system as described in pending U.S. patent application Ser. No. 10/168,544, filed on Jul. 2, 2002, the contents of which are incorporated herein by reference in their entirety, or a thermocouple such as a K-type thermocouple. Examples of optical thermometers include: an optical fiber thermometer commercially available from Advanced Energies, Inc., Model No. OR2000F; an optical fiber thermometer commercially available from Luxtron Corporation, Model No. M600; or an optical fiber thermometer commercially available from Takaoka Electric Mfg., Model No. FT-1420.

The temperature monitoring system can provide sensor information to a control system in order to adjust at least one of a heating element, a cooling element, a backside gas supply system, or an HV DC voltage supply for an electrostatic clamp either before, during, or after processing.

The control system may include a microprocessor, memory, and a digital I/O port (potentially including D/A and/or A/D converters) capable of generating control voltages sufficient to communicate and activate inputs to electrostatic chuck 100 as well as monitor outputs from electrostatic chuck 100. The control system can be coupled to and exchange information with the heating element control unit, the fluid thermal control unit, the HV DC voltage supply, the backside gas supply system, and temperature monitoring system. A program stored in the memory is utilized to interact with the aforementioned components of substrate holder according to a stored process recipe.

The control system may also be implemented as a general purpose computer, processor, digital signal processor, etc., which causes a substrate holder to perform a portion or all of the processing steps of the invention in response to the control system executing one or more sequences of one or more instructions contained in a computer readable medium. The computer readable medium or memory is configured to hold instructions programmed according to the teachings of the invention and can contain data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

The control system may be locally located relative to the electrostatic chuck 100, or it may be remotely located relative to the electrostatic chuck 100 via an internet or intranet. Thus, control system can exchange data with the electrostatic chuck 100 using at least one of a direct connection, an intranet, or the internet. The control system may be coupled to an intranet at a customer site (i.e., a device maker, etc.), or coupled to an intranet at a vendor site (i.e., an equipment manufacturer). Furthermore, another computer (i.e., controller, server, etc.) can access the control system to exchange data via at least one of a direct connection, an intranet, or the internet.

Optionally, the electrostatic chuck 100 can include a RF electrode through which RF power is coupled to plasma in a processing region above the substrate. For example, the RF electrode may comprise the electrostatic clamp electrode 118. However, the RF electrode may be independent from the electrostatic clamp electrode 118. Additionally, for example, the electrostatic clamp electrode 118 can be electrically biased at an RF voltage via the transmission of RF power from an RF generator through an impedance match network to electrostatic chuck 100. The RF bias can serve to heat electrons to form and maintain plasma, or bias the substrate in order to control ion energy incident on the substrate, or both. In this configuration, the system can operate as a reactive ion etch (RIE) reactor, where the chamber and an upper gas injection electrode serve as ground surfaces. A typical frequency for the RF bias can range from 1 MHz to 100 MHz and is preferably 13.56 MHz.

Alternately, RF power can be applied to the substrate holder electrode at multiple frequencies. Furthermore, an impedance match network can serve to maximize the transfer of RF power to plasma in the processing chamber by minimizing the reflected power. Various match network topologies (e.g., L-type, pi-type, T-type, etc.) and automatic control methods can be utilized.

Referring still to FIG. 2, electrostatic chuck 100 may further comprise a focus ring 150, a first insulator ring 152, and a second insulator ring 154. Additionally, electrostatic chuck 100 may further comprise a lift-pin assembly (not shown) configured to raise the substrate to and from the outer surface 112 of the chuck body 110.

Figure 3:
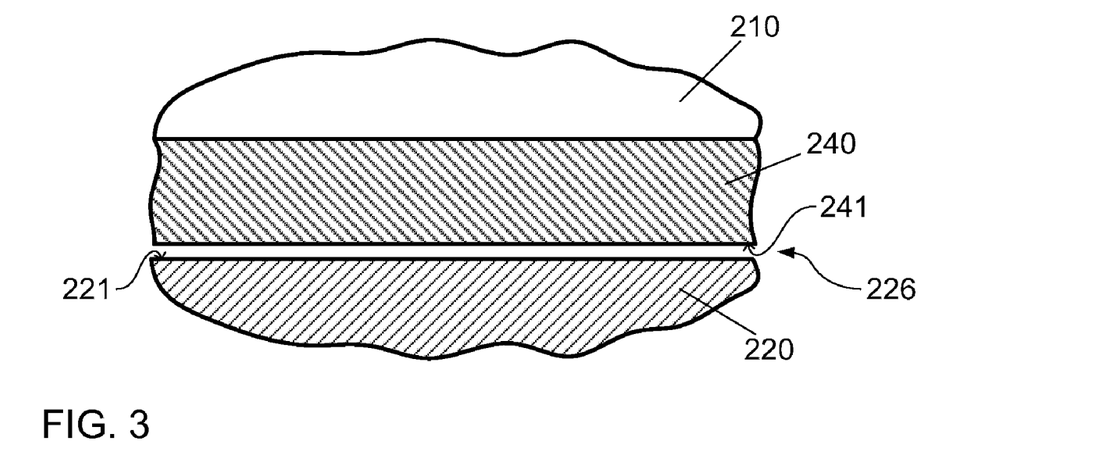
FIG. 3 presents an exploded schematic cross-sectional view of a substrate holder according to an embodiment.

Referring now to FIG. 3, an exploded cross-sectional view of an electrostatic chuck is illustrated. The electrostatic chuck comprises a chuck body 210 and a heat sink body 220. FIG. 3 further shows an optional heat transfer member 240 in contact with the chuck body 210 such that a gap 226 separates a heat transfer surface 221 on the heat sink body 220 from an inner surface 241 on the optional heat transfer member 240. Alternatively, the heat transfer member 240 may be omitted. Heat (measured in Watts, W) is exchanged between the inner surface 241 and the heat transfer surface 221 through gap 226 according to the relation $Q=hA\Delta T$, wherein h is a heat transfer coefficient for heat flow through gap 226, A represents the surface area of the inner surface 241 and the heat transfer surface 221 through which heat is exchanged, and $\Delta T$ is the temperature difference between the heat transfer member 240 and the heat sink body 220. In order to increase the heat transfer Q, the thickness of gap 226 may be decreased and/or the surface area A may be increased.

Figure 4:
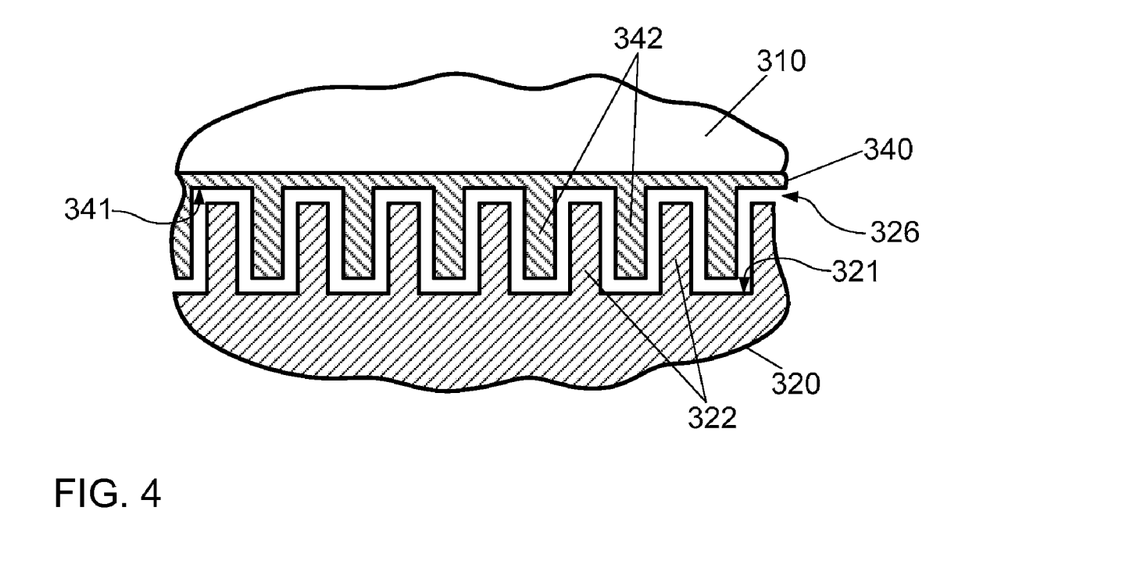
FIG. 4 presents an exploded schematic cross-sectional view of a substrate holder according to another embodiment.

Referring now to FIG. 4, an exploded cross-sectional view of an electrostatic chuck is illustrated. The electrostatic chuck comprises a chuck body 310 and a heat sink body 320. FIG. 4 further shows an optional heat transfer member 340 in contact with the chuck body 310 such that a gap 326 separates a heat transfer surface 321 on the heat sink body 320 from an inner surface 341 on the optional heat transfer member 340. Alternatively, the heat transfer member 340 may be omitted. The inner surface 341 of the chuck body 310 or heat transfer member 340 comprises a first array of projections 342 extending outward from the inner surface 341. Additionally, the heat transfer surface 321 of the heat sink body 320 comprises a second array of projections 322 extending outward from the heat transfer surface 321. The first array of projections 342 are configured to interlace with the second array of projections 322 without contact therebetween in order to increase the surface area between these surfaces through which heat may be exchanged.

Figure 5A:
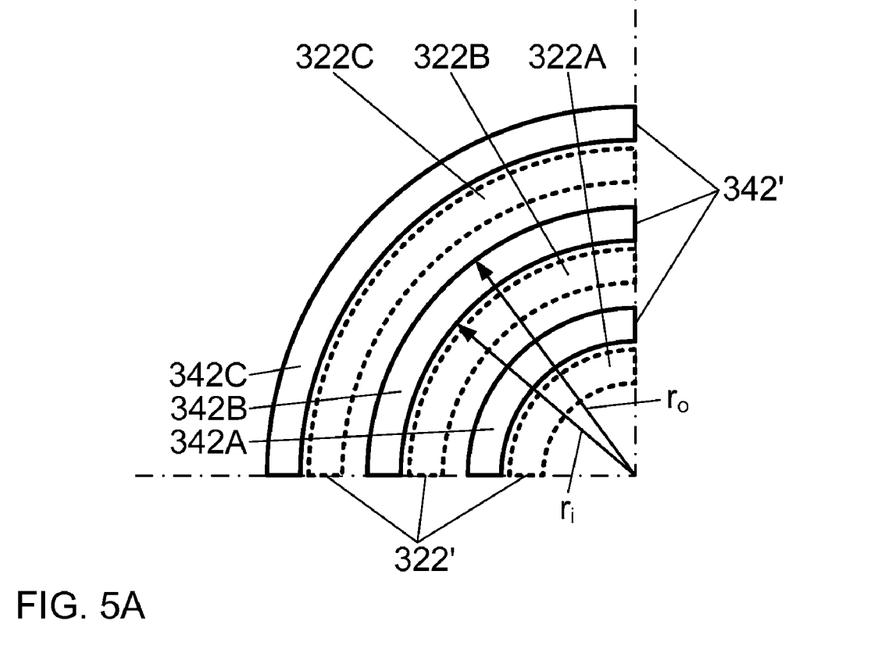
FIGS. 5A and 5B illustrate a cross-sectional view of a substrate holder according to another embodiment.
Figure 5B:
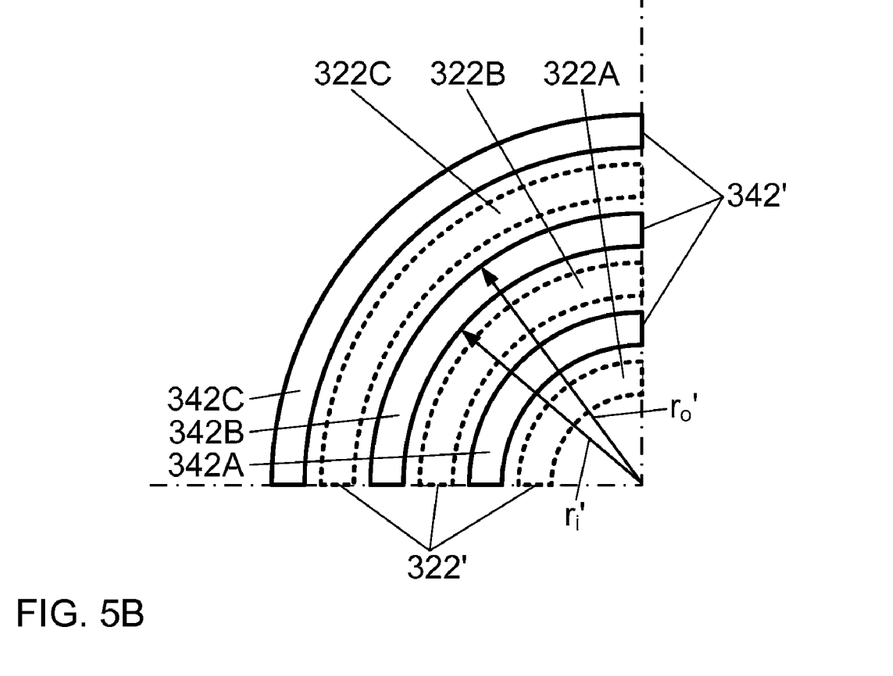

For example, as illustrated in FIGS. 5A and 5B, a first array of projections 342' (e.g., corresponding to a heat transfer member or chuck body as described above) may comprise a first array of one or more concentric fins 342A, 342B, 342C, and the second array of projections 322' (e.g., corresponding to a heat sink body as described above) may comprise a second array of one or more concentric fins 322A, 322B, 322C. Each concentric fin in the first array of one or more concentric fins 342A, 342B, 342C and each concentric fin in the second array of one or more concentric fins 322A, 322B, 322C may be defined by an inner radius ($r_i$) and outer radius ($r_o$).

Additionally, for example, each concentric fin in the first array of one or more concentric fins 342A, 342B, 342C and each concentric fin in the second array of one or more concentric fins 322A, 322B, 322C may be spaced to accommodate for a difference in thermal expansion between the chuck body and the heat sink body. For example, the inner radius ($r_i$) of each concentric fin in the first array of projections 342' may be radially spaced closer to the outer radius ($r_o$) of each concentric fin in the second array of projections 322' than the outer radius of each concentric fin in the first array of projections 342' is spaced to the inner radius of each concentric fin in the second array of projections 322'. This initial spacing shown in FIG. 5A may, for instance, correspond to room temperature. As illustrated in FIG. 5B, when the temperature of the chuck body is increased above the initial temperature (i.e., room temperature), the chuck body expands a radial distance greater that of the (lower temperature) heat sink body. Once the chuck body reaches a design temperature, the final radii ($r_i'$ and $r_o'$) are such that the first array of projections 342' and the second array of projections 322' are substantially equally spaced in the radial direction.

Figure 6:
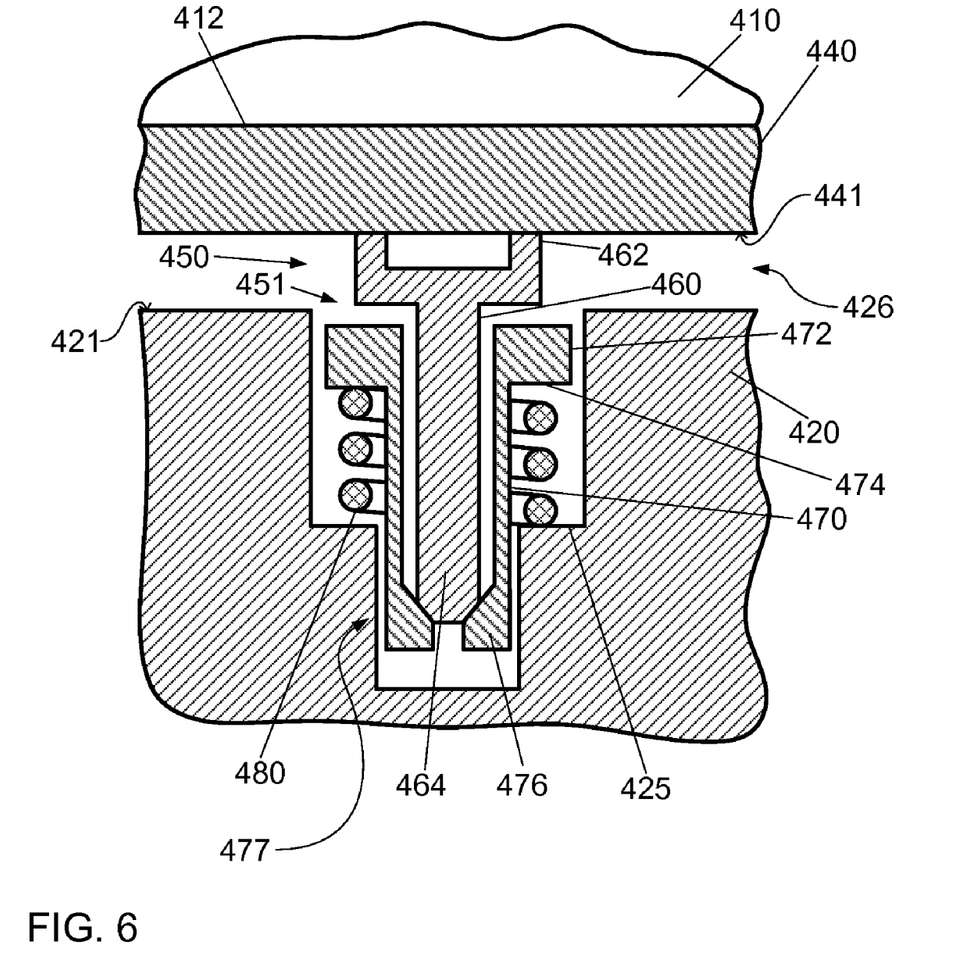
FIG. 6 presents a cross-sectional view of a contact assembly according to an embodiment.

Referring now to FIG. 6, an exploded cross-sectional view of an electrostatic chuck is illustrated. The electrostatic chuck comprises a chuck body 410 and a heat sink body 420. As shown in FIG. 6, the chuck body 410 may comprise an heat transfer member 440 in contact with the chuck body 410 such that a gap 426 separates a heat transfer surface 421 on heat sink body 420 from an inner surface 441 of the heat transfer member 440. The heat transfer member 440 may be coupled to the chuck body 410 by conventional means including fasteners. Alternatively, the heat transfer member 440 is pressed against the chuck body 410 using a contact assembly 450.

As shown in FIG. 6, the contact assembly 450 may comprise a spring assembly 451. The spring assembly 451 comprises an inner pole member 460 having a first end 462 configured to contact the heat transfer member 440 and a second end 464 opposite the first end 462. Additionally, the spring assembly 451 comprises a cup member 470 concentric about the inner pole member 460, and having a lip end 472 with a lip 474 and a distal end 476 configured to receive the second end 464 of the inner pole member 460. Furthermore, the spring assembly 451 comprises a spring 480 disposed between the lip 474 on the cup member 470 and a support surface 425 on the heat sink body 420. When the chuck body 410, the heat transfer member 440 and the heat sink body 420 are assembled and arranged such the spring 480 is compressed, a spring force is applied to the heat transfer member 440 to press it against chuck body 410. As a result, the mechanical contact at interface 412 between chuck body 410 and heat transfer member 440 is improved.

The contact assembly 450 may be designed to provide adequate thermal resistance to heat flow between the chuck body 410 and the heat sink body 420 through the contact assembly 450. Additionally, the contact assembly 450 may be designed such that spring 480 may be maintained relatively cool. For example, as illustrated in FIG. 6, a lower portion 477 of cup member 470 is disposed in close proximity to the heat sink body 420. Due to this close proximity, the preferred heat transfer path includes heat flow from the chuck body 410 through the inner pole member 460 and through the lower portion 477 of cup member 470 to the heat sink body 420 (as opposed to heat flow from the chuck body 410 through the inner pole member 460 to the lower portion 477 of cup member 470, up through the cup member 470 to the lip end 472, and through spring 480 to the heat sink body 420). As a result, the potential for excessive temperatures in spring 480 may be circumvented.

Furthermore, the inner pole member 460 may comprise a thermally resistive material (i.e., low thermal conductance) in order to reduce or prevent a "cold" spot on the heat transfer member 440 or the chuck body 410, and limit heat transfer from the heat transfer member 440 or the chuck body 410 to the heat sink body 420 through the contact assembly 450 (e.g., the inner pole member 460 may sustain a relatively large temperature difference along its length). As an example, the inner pole member 460 may be fabricated from zirconia, and the spring 480 and the cup member 470 may be fabricated from stainless steel.

The contact assembly 450 may be designed to provide a specific thermal contact resistance (TCR) (i.e., equivalent to the inverse of the heat transfer coefficient, h) between the chuck body 410 and the heat transfer member 440. The TCR may be affected by a number of variables including, but not limited to, the material composition of the chuck body 410, the material composition of the heat transfer member 440, the contact surface properties (e.g., surface finish) of the chuck body 410, the contact surface properties (e.g., surface finish) of the heat transfer member 410, the gaseous environment (e.g., gas composition, pressure, etc.) between the chuck body 410 and the heat transfer member 440, and the clamping pressure provided by one or more contact assemblies 450 (e.g., clamping pressure may be affected by the number of contact assemblies 450, the spring force for each contact assembly 450, etc.).

The TCR between the chuck body 410 and the heat transfer member 440 may affect, among other things, the temperature uniformity of the substrate (e.g., the center-to-edge temperature difference across the substrate). As an example, the TCR between the chuck body 410 and the heat transfer member 440 may be about 0.001 K-m$^2$/W or greater. Alternatively, for example, the TCR between the chuck body 410 and the heat transfer member 440 may be about 0.002 K-m$^2$/W or greater. Alternatively, for example, the TCR between the chuck body 410 and the heat transfer member 440 may be about 0.01 K-m$^2$/W or greater.

As the TCR is increased, the temperature disparity between the center and the edge of the chuck body 410 decreases. Furthermore, as the TCR is increased, the fraction of the heat transfer between the chuck body 410 and the heat sink body 420 through gap 426 increases. Therefore, the TCR may be selected and/or adjusted to achieve a target temperature uniformity on the substrate.

The thermal contact may be further improved by disposing a heat transfer material between the chuck body 410 and the heat transfer member 440. For example, the heat transfer material may comprise a graphite impregnated polymer.

Figure 7:
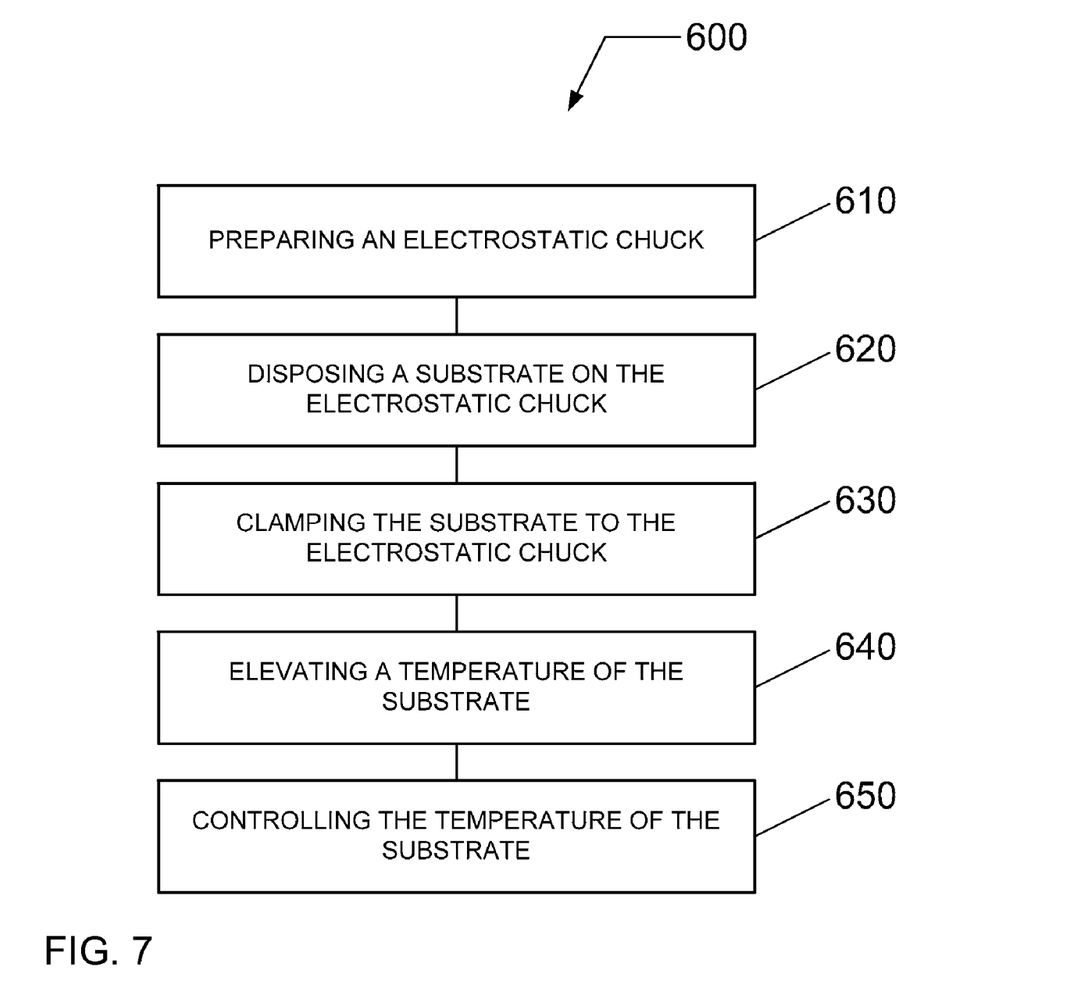
FIG. 7 illustrates a method of operating a high temperature electrostatic chuck according to an embodiment.

Referring now to FIG. 7, a flowchart describing a method 600 of controlling the temperature of a substrate on an electrostatic chuck substrate holder in a processing system is presented according to another embodiment. For example, the temperature control scheme can pertain to multiple process steps for a process in a processing system having an electrostatic chuck such as one of those described in FIGS. 2 through 6. The method 600 begins in 610 with preparing an electrostatic chuck for use in a substrate processing system, wherein the electrostatic chuck comprises a chuck body, a heat sink body, a table assembly configured to support the chuck body and the heat sink body, and an expansion joint disposed between the chuck body and the table assembly, and configured to sealably join the chuck body to the table assembly while accommodating for differential thermal expansion of the chuck body and the table assembly.

In 620, a substrate is disposed on the electrostatic chuck.

In 630, the substrate is clamped to the outer surface of the chuck body by coupling a voltage to an electrostatic clamp electrode formed within the chuck body.

In 640, a temperature of the substrate is elevated by coupling power to one or more heating elements formed within the chuck body.

The substrate may be clamped to the chuck body once the temperature of the substrate is elevated. By doing so, the substrate may be relieved of any undesirable stresses imposed by clamping the substrate followed by heating the substrate. However, in an alternative embodiment, the substrate may be clamped and then heated.

In 650, the temperature of the substrate is controlled by maintaining the heat sink body at a heat sink temperature less than the temperature of the substrate and spacing a heat transfer surface of the heat sink body in close relationship to an inner surface of the chuck body. For example, the temperature of the substrate may be controlled at a temperature up to about 450 degrees C. Alternatively, for example, the temperature of the substrate may be controlled at a temperature up to about 400 degrees C. Alternatively, for example, the temperature of the substrate may be controlled at a temperature up to about 300 degrees C. Alternatively, for example, the temperature of the substrate may be controlled at a temperature up to about 200 degrees C. Alternatively, for example, the temperature of the substrate may be controlled at a temperature up to about 100 degrees C.

Additionally, the temperature uniformity of the substrate may be controlled. For example, the temperature uniformity (%) ($T_{unif}=[(T_{max}-T_{min})/T_{average}]\times 100\%$) may be less than or equal to about 1%. Alternatively, the temperature uniformity may be less than or equal to about 5%. Alternatively, the temperature uniformity may be less than or equal to about 10%. Alternatively, the temperature uniformity may be less than or equal to about 25%. Furthermore, for example, the center-to-edge temperature difference may be adjusted and/or controlled.

Thereafter, the substrate may be de-chucked (or de-clamped), cooled, and then removed from the chuck body. The de-chucking of the substrate may be performed while the temperature of the substrate is elevated. By doing so, the substrate may be relieved of any undesirable stresses imposed by cooling the substrate followed by de-chucking the substrate. However, in an alternative embodiment, the substrate may be cooled and then de-chucked.

Although only certain embodiments of this invention have been described in detail above, those skilled in the art will readily appreciate that many modifications are possible in the embodiments without materially departing from the novel teachings and advantages of this invention. Accordingly, all such modifications are intended to be included within the scope of this invention.

What is claimed is:

1. An electrostatic chuck configured for substrate processing, comprising:
   a chuck body comprising an electrostatic clamp electrode and an optional heating element, wherein said electrostatic clamp electrode is configured to clamp a substrate on an outer surface of said chuck body;
   a heat sink body comprising a heat transfer surface spaced in close relationship with an inner surface of said chuck body, such that a gap is formed between said heat transfer surface and said inner surface, wherein said heat sink body is configured to remove heat from said chuck body due to the close relationship of said inner surface and said heat transfer surface;

a table assembly configured to support said chuck body and said heat sink body; and an expansion joint disposed between said chuck body and said table assembly, and configured to sealably join said chuck body to said table assembly while accommodating for differential thermal expansion of said chuck body and said table assembly.

2. The electrostatic chuck of claim 1, wherein said expansion joint comprises a Ni—Co—Fe alloy.

3. The electrostatic chuck of claim 1, wherein said chuck body comprises a metallic material, or a ceramic material, or both.

4. The electrostatic chuck of claim 1, wherein said expansion joint comprises a thin ring having a first end configured to be attached to said chuck body and a second end configured to be attached to said table assembly.

5. The electrostatic chuck of claim 4, wherein said first end of said thin ring is brazed to said chuck body.

6. The electrostatic chuck of claim 4, wherein said second end of said thin ring is welded to a mounting flange, and wherein said mounting flange is configured to be sealably fastened to said table assembly.

7. The electrostatic chuck of claim 1, wherein said expansion joint is composed of a material having a thermal expansion coefficient of intermediary value between that of said chuck body and that of said table assembly.

8. The electrostatic chuck of claim 1, wherein said heat sink body comprises one or more fluid channels through which a heat transfer fluid flows from an inlet to each of said one or more fluid channels to an outlet of said one or more fluid channels.

9. The electrostatic chuck of claim 1, wherein said optional heating element comprises a resistive heating element.

10. The electrostatic chuck of claim 1, wherein:
said inner surface of said chuck body comprises a first array of projections extending outward from said inner surface and said heat transfer surface of said heat sink body comprises a second array of projections extending outward from said heat transfer surface, and said first array of projections are configured to interlace with said second array of projections without contact therebetween.

11. The electrostatic chuck of claim 10, wherein said first array of projections comprises a first array of one or more concentric fins, and wherein said second array of projections comprises a second array of one or more concentric fins.

12. The electrostatic chuck of claim 11, wherein each concentric fin in said first array of one or more concentric fins and each concentric fin in said second array of one or more concentric fins are spaced to accommodate for a difference in thermal expansion between said chuck body and said heat sink body.

13. The electrostatic chuck of claim 1, wherein said chuck body comprises a ceramic body and a heat transfer member pressed against said ceramic body, and wherein said heat transfer member provides said inner surface in close relationship to said heat transfer surface of said heat sink body.

14. The electrostatic chuck of claim 13, wherein said heat transfer member is pressed against said ceramic body of said chuck body using a spring assembly disposed between said heat transfer member and said heat sink body.

15. The electrostatic chuck of claim 13, wherein a heat transfer material is disposed between said ceramic body and said heat transfer member.

16. The electrostatic chuck of claim 15, wherein said heat transfer material comprises a graphite impregnated polymer.

17. The electrostatic chuck of claim 14, wherein said spring assembly comprises:
an inner pole member having a first end configured to contact said heat transfer member and a second end opposite said first end;
a cup member concentric about said inner pole member, and comprising a lip end having a lip and a distal end configured to receive said second end of said inner pole member; and
a spring disposed between said lip on said cup member and a support surface on said heat sink body.

18. The electrostatic chuck of claim 1, further comprising:
a heat transfer gas supply system configured to supply a heat transfer gas to a backside of said substrate;
an electrode for coupling a radio frequency (RF) voltage to said substrate; or
a lift pin assembly configured to raise said substrate to and from said outer surface of said chuck body; or
any combination of two or more thereof.

19. A method of operating a high temperature electrostatic chuck, comprising:
preparing an electrostatic chuck for use in a substrate processing system, said electrostatic chuck comprising a chuck body, a heat sink body, a table assembly configured to support said chuck body and said heat sink body, and an expansion joint disposed between said chuck body and said table assembly, and configured to sealably join said chuck body to said table assembly while accommodating for differential thermal expansion of said chuck body and said table assembly;
disposing a substrate on an outer surface of said chuck body;
clamping said substrate to said outer surface of said chuck body by coupling a voltage to an electrostatic clamp electrode formed within said chuck body;
elevating a temperature of said substrate by coupling power to one or more heating elements formed within said chuck body; and
controlling said temperature of said substrate by maintaining said heat sink body at a heat sink temperature less than said temperature of said substrate and spacing a heat transfer surface of said heat sink body in close relationship to an inner surface of said chuck body,
wherein the heat sink body comprises a heat transfer surface spaced in close relationship with an inner surface of said chuck body, such that a gap is formed between the heat transfer surface and the inner surface.

20. The method of claim 19, wherein said controlling said temperature of said substrate comprises uniformly controlling said temperature of said substrate at a temperature up to about 450 degrees C.

21. An electrostatic chuck configured for substrate processing, comprising:
a chuck body comprising an electrostatic clamp electrode and an optional heating element, wherein said electrostatic clamp electrode is configured to clamp a substrate on an outer surface of said chuck body;
a heat sink body comprising a heat transfer surface spaced in close relationship with an inner surface of said chuck body, wherein said heat sink body is configured to remove heat from said chuck body due to the close relationship of said inner surface and said heat transfer surface;
a table assembly configured to support said chuck body and said heat sink body; and an expansion joint disposed between said chuck body and said table assembly, and configured to sealably join said chuck body to said table assembly while accommodating for differential thermal expansion of said chuck body and said table assembly, wherein said expansion joint comprises a thin ring having a first end configured to be attached to said chuck body and a second end configured to be attached to said table assembly, wherein said second end of said thin ring is welded to a mounting flange, and wherein said mounting flange is configured to be sealably fastened to said table assembly, and wherein said chuck body comprises a ceramic body and a heat transfer member pressed against said ceramic body, and wherein said heat transfer member provides said inner surface in close relationship to said heat transfer surface of said heat sink body.

22. The electrostatic chuck of claim 21, wherein said expansion joint comprises a Ni—Co—Fe alloy.

23. The electrostatic chuck of claim 21, wherein said chuck body comprises a metallic material, or a ceramic material, or both.

24. The electrostatic chuck of claim 21, wherein said first end of said thin ring is brazed to said chuck body.

25. The electrostatic chuck of claim 21, wherein said expansion joint is composed of a material having a thermal expansion coefficient of intermediary value between that of said chuck body and that of said table assembly.

26. The electrostatic chuck of claim 21, wherein said heat transfer member is pressed against said ceramic body of said chuck body using a spring assembly disposed between said heat transfer member and said heat sink body.

27. The electrostatic chuck of claim 21, wherein a heat transfer material is disposed between said ceramic body and said heat transfer member.

28. The electrostatic chuck of claim 27, wherein said heat transfer material comprises a graphite impregnated polymer.

29. The electrostatic chuck of claim 26, wherein said spring assembly comprises:
an inner pole member having a first end configured to contact said heat transfer member and a second end opposite said first end;
a cup member concentric about said inner pole member, and comprising a lip end having a lip and a distal end configured to receive said second end of said inner pole member; and
a spring disposed between said lip on said cup member and a support surface on said heat sink body.

30. An electrostatic chuck configured for substrate processing, comprising:
a chuck body comprising an electrostatic clamp electrode and an optional heating element, wherein said electrostatic clamp electrode is configured to clamp a substrate on an outer surface of said chuck body;
a heat sink body comprising a heat transfer surface spaced in close relationship with an inner surface of said chuck body, wherein said heat sink body is configured to remove heat from said chuck body due to the close relationship of said inner surface and said heat transfer surface;
a table assembly configured to support said chuck body and said heat sink body; and
an expansion joint disposed between said chuck body and said table assembly, and configured to sealably join said chuck body to said table assembly while accommodating for differential thermal expansion of said chuck body and said table assembly,
wherein said inner surface of said chuck body comprises a first array of projections extending outward from said inner surface and said heat transfer surface of said heat sink body comprises a second array of projections extending outward from said heat transfer surface, and said first array of projections are configured to interlace with said second array of projections without contact therebetween.

31. The electrostatic chuck of claim 30, wherein said first array of projections comprises a first array of one or more concentric fins, and wherein said second array of projections comprises a second array of one or more concentric fins.

32. The electrostatic chuck of claim 31, wherein each concentric fin in said first array of one or more concentric fins and each concentric fin in said second array of one or more concentric fins are spaced to accommodate for a difference in thermal expansion between said chuck body and said heat sink body.

33. The electrostatic chuck of claim 30, wherein said expansion joint comprises a Ni—Co—Fe alloy.

34. The electrostatic chuck of claim 30, wherein said chuck body comprises a metallic material, or a ceramic material, or both.

35. The electrostatic chuck of claim 30, wherein said expansion joint comprises a thin ring having a first end configured to be attached to said chuck body and a second end configured to be attached to said table assembly, and wherein said first end of said thin ring is brazed to said chuck body.

36. The electrostatic chuck of claim 30, wherein said expansion joint is composed of a material having a thermal expansion coefficient of intermediary value between that of said chuck body and that of said table assembly.

37. The electrostatic chuck of claim 30, wherein said chuck body comprises a ceramic body and a heat transfer member pressed against said ceramic body, and wherein said heat transfer member provides said inner surface in close relationship to said heat transfer surface of said heat sink body.

* * * * *